United States Patent
Hardee et al.

(10) Patent No.: US 10,782,954 B2
(45) Date of Patent: Sep. 22, 2020

(54) USER DEFINED APPLICATION INTERFACE

(71) Applicant: INTERNATIONAL BUSINESS MACHINES CORPORATION, Armonk, NY (US)

(72) Inventors: Christopher J. Hardee, Raleigh, NC (US); Steven R. Joroff, Tokyo (JP); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

(21) Appl. No.: 15/286,091

(22) Filed: Oct. 5, 2016

(65) Prior Publication Data

US 2018/0095626 A1  Apr. 5, 2018

(51) Int. Cl.
*G06F 17/00* (2019.01)
*G06F 8/65* (2018.01)
*G06F 8/61* (2018.01)
*G06F 9/445* (2018.01)

(52) U.S. Cl.
CPC .................. *G06F 8/65* (2013.01); *G06F 8/61* (2013.01); *G06F 9/4451* (2013.01)

(58) Field of Classification Search
CPC ........ G06F 3/0484; G06F 3/0482; G06F 8/61; G06F 8/65; G06F 9/4451; H04L 67/306; H04L 67/10
USPC ......................................................... 715/745
See application file for complete search history.

(56) References Cited

U.S. PATENT DOCUMENTS

| | | | |
|---|---|---|---|
| 6,167,567 A * | 12/2000 | Chiles | G06F 9/454 717/173 |
| 7,743,407 B2 | 6/2010 | Sprigg et al. | |
| 8,230,451 B2 | 7/2012 | Culbreth et al. | |
| 2012/0239786 A1* | 9/2012 | Repasi | H04L 12/6418 709/219 |
| 2012/0311659 A1 | 12/2012 | Narain et al. | |
| 2013/0173637 A1* | 7/2013 | Kim | G06F 17/30283 707/748 |
| 2014/0109080 A1* | 4/2014 | Ricci | G06F 8/61 717/174 |
| 2014/0267770 A1* | 9/2014 | Gervautz | H04N 5/23296 348/169 |
| 2014/0276571 A1* | 9/2014 | Ludolph | A61M 5/172 604/506 |
| 2014/0331281 A1 | 11/2014 | Bettini et al. | |
| 2015/0095322 A1* | 4/2015 | Procopio | G06F 17/3053 707/723 |
| 2015/0186533 A1* | 7/2015 | Patil | G06Q 30/0631 707/723 |
| 2015/0249673 A1* | 9/2015 | Niemoeller | H04W 12/08 726/4 |
| 2016/0072913 A1* | 3/2016 | Baldwin | H04L 67/306 709/201 |
| 2018/0048473 A1* | 2/2018 | Miller | G06F 8/65 |

\* cited by examiner

*Primary Examiner* — Jason T Edwards
(74) *Attorney, Agent, or Firm* — Griffiths & Seaton PLLC

(57) ABSTRACT

Embodiments for providing a user defined application interface by a processor. A user profile defining one or more application behavior settings relating to at least behavior and appearance of a mobile application such that the user profile is referenced for providing a filtered selection of a plurality of mobile applications for selection.

12 Claims, 6 Drawing Sheets

USER DEFINED APPLICATION INTERFACE

BACKGROUND OF THE INVENTION

Field of the Invention

The present invention relates in general to computing systems, and more particularly to, various embodiments for providing a user defined application or device interface using a computing processor.

Description of the Related Art

Computing systems may be found in the workplace, at home, or at school. Stationary and mobile electronic devices are an integral part of modern life. Computers, notebooks, tablet computers, smart phones and other portable devices comprise more than half of all computers produced worldwide. People use them to communicate, work, relax, and study. Mobile applications are particularly popular on electronic devices such as smart phones because they provide access to a wide variety of services, communication, entertainment, or information in the digital age. Mobile applications such as schedulers, address books, alarms, calculators, games, motion pictures, educational services, internet access, music reproduction, navigators, word processors, and spreadsheets are becoming increasingly available. The mobile content market is called an Application Store, or "AppStore".

SUMMARY OF THE INVENTION

Various embodiments for providing a user defined application interface by a processor, are provided. In one embodiment, by way of example only, a method for providing a user defined application interface between a computing device and an application store, again by a processor, is provided. A user profile defining one or more application behavior settings relating to at least behavior and appearance of a mobile application such that the user profile is referenced for providing a filtered selection and/or list of a plurality of mobile applications for selection.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
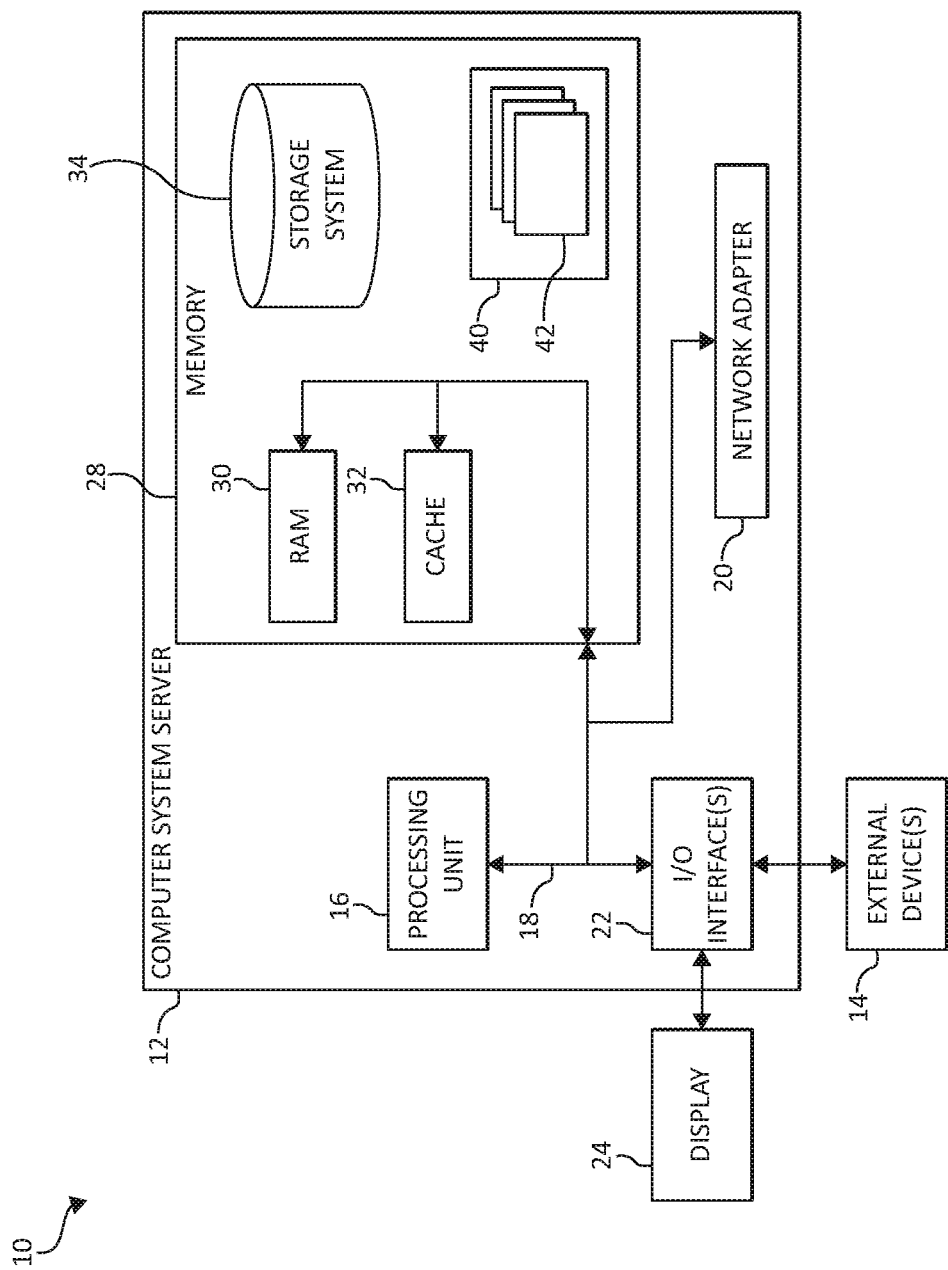
FIG. 1 is a block diagram depicting an exemplary cloud computing node according to an embodiment of the present invention.

As a preliminary matter, data is increasingly processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

With the proliferation and use of various types of computing devices, various types of applications ("apps") such as, for example, a mobile application, may be used on a computer such as a tablet, phone, PC, laptop, or any other type of computing device. For example, a wide variety of apps may be developed (e.g., via an application publisher) and distributed for mobile and other computing platforms. Apps can range across a variety of categories and genres such as games, education, business, entertainment, finance, reference, kids, books, lifestyle, medical, music, news, photo, productivity, social networking, sports, travel, and utilities, as examples.

Many of these mobile applications request permissions to access specific data or sensors when being installed on a device. This can lead to a user beginning the process of installing an application only to experience the permissions to install the application also may include requesting access to something the user may not want to approve access to, and/or even install the application itself. For example, malware on some computing devices are notorious for requesting excess permissions during installation or updating.

To address these challenges, the mechanisms of the present invention provide a user defined application or device interface in order to allow an end user to specify behavior and appearance of an application, which may be provided by an application store. A user may filter or sort one or more applications, via the user defined application or device interface, provided by an application store according to the defined definitions and the applications' abilities to conform to a user profile. That is, the user may create a user profile, which may be stored and maintained in the application store. The user profile may include defined behavior and appearance settings in order to install only the applications matching the user profile. Using the user profile, the application store may filter or sort each application provided by the application store and only provide a selection and/or list of the filtered or sorted applications to the user that match the behavior and appearance settings included in the user profile. In this way, the installation of a selected application eliminates any unwanted access or providing excessive permissions during selection and installation of the application.

Moreover, the overall installation efficiency, in addition to the selection and installation, for updating an application for a user is improved. For example, if an update to an installed application matches the user profile, the update may be allowed to be installed without requesting authorization or permission for install from the user. Alternatively, if the update causes the application to no longer conform with the user profile (e.g., the updated application no longer matches the user profile), the user is provided notification of the potential update causing the installed application to no longer match the user profile, requests permissions to install the upgrade, and/or may optionally find a replacement application that does match the user profile to install for the user. In one aspect, one or more permissions and/or other settings can use a white-list, black-list, and/or list of preferences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
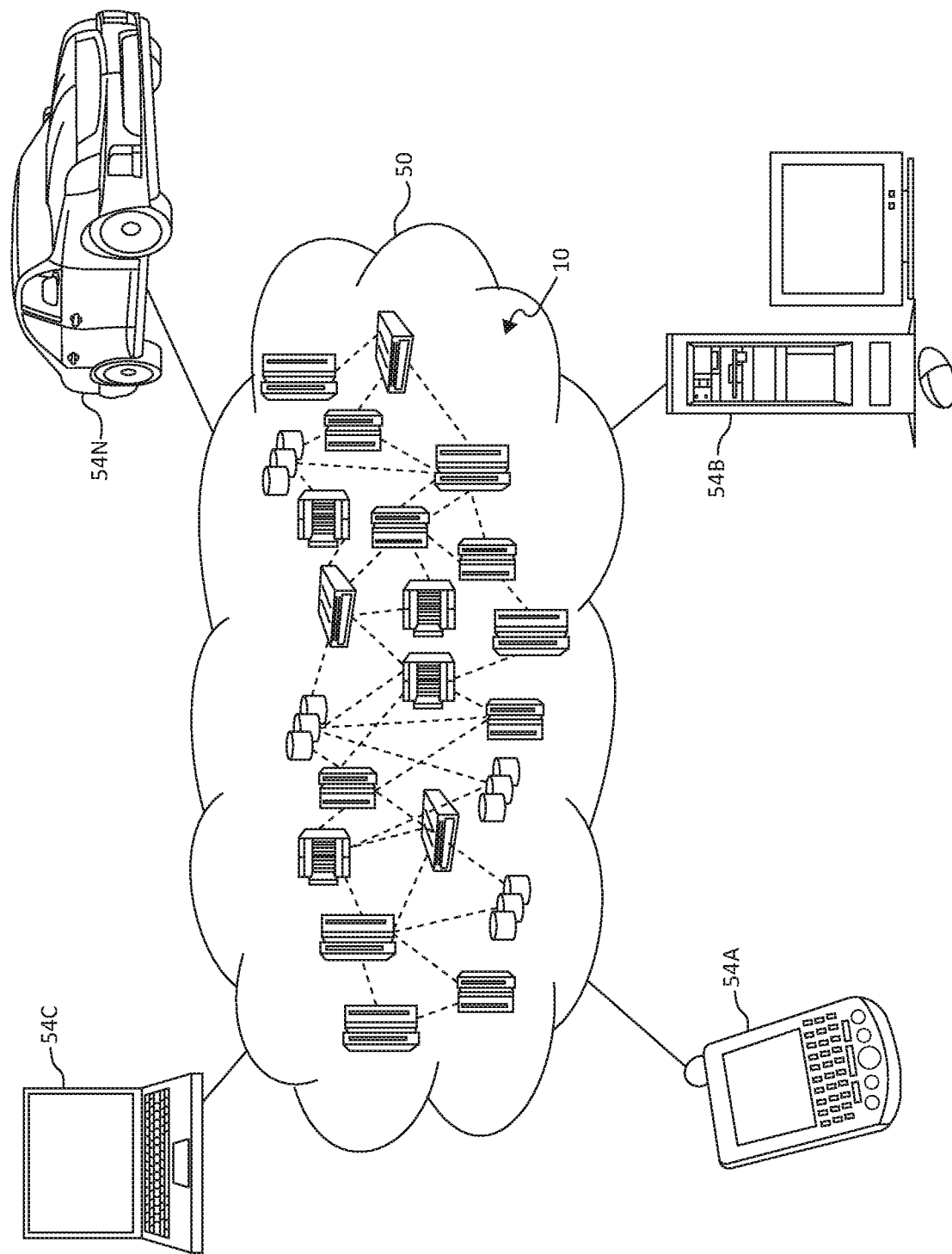
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
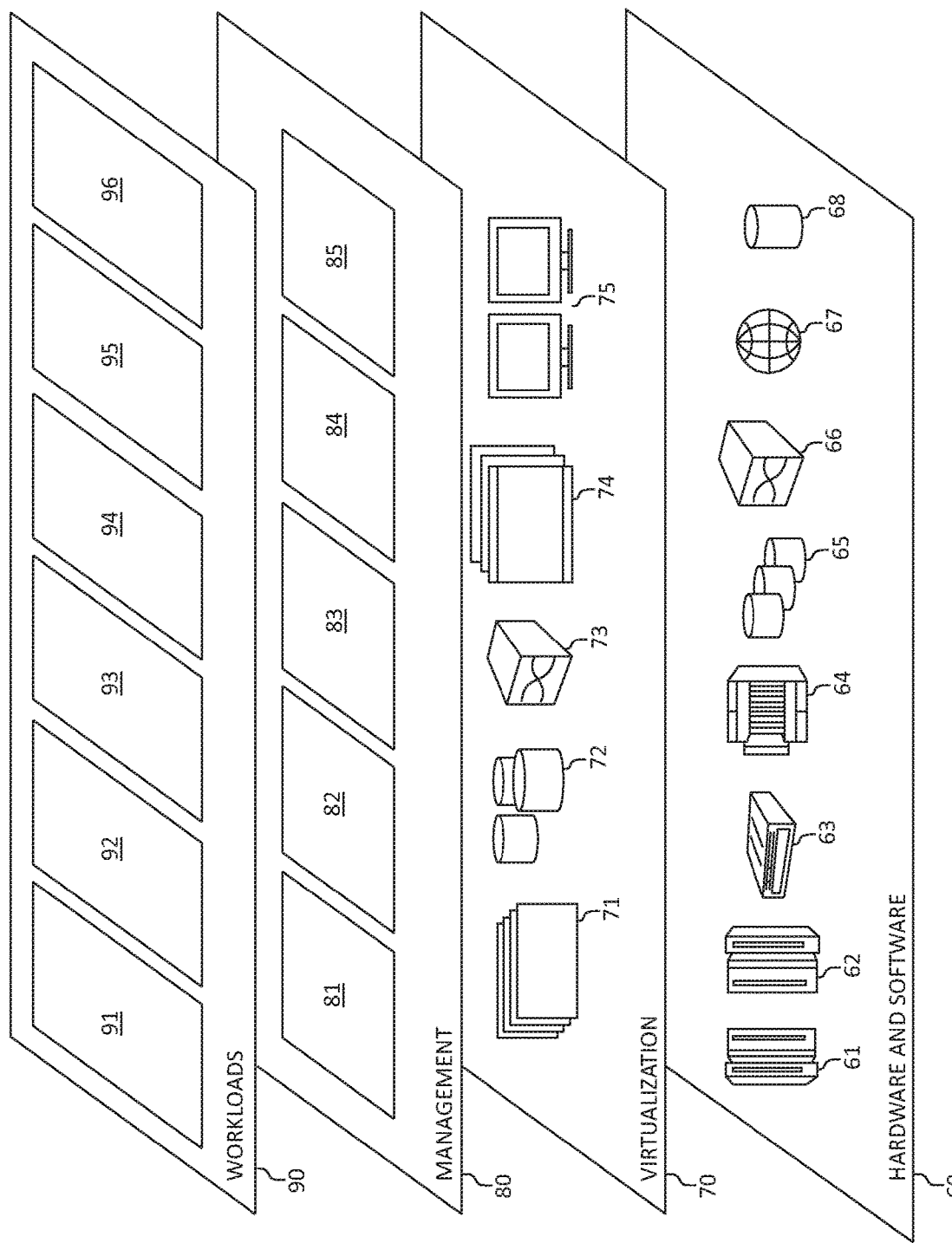
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various user defined application or device interface workloads and functions 96. In addition, user defined application or device interface workloads and functions 96 may include such operations as context metadata analytics, context metadata analysis, and as will be further described, user and device management functions. One of ordinary skill in the art will appreciate that the user defined application or device interface workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for a user defined application or device interface, by a processor. In one embodiment, by way of example only, a method for a user defined application interface, again by a processor, is provided. A user profile defining one or more application behavior settings relating to at least behavior and appearance of a mobile application such that the user profile is referenced for providing a filtered selection and/or list of a plurality of mobile applications for selection.

As will be further described, in addition to mechanisms for providing a user defined application or device interface, other aspects of the illustrated embodiments may include the following. First, the functionality of the user's device itself may be augmented to include the connectivity to an application store and retrieve information therefrom. Next, the mechanisms of the illustrated embodiments include methodologies for creating one or more application behavior settings. The user may define the one or more application behavior settings to include elements such as theme, graphics settings, sound settings, notification behavior, locations of install, permissions, and the like.

In one aspect, the application behavior settings may be created from base settings for a previously installed application. The application behavior settings may be shared between others, such as a computing network. The mechanisms of the embodiments may specify settings that are required or preferred, optionally allowing weighting for the importance of a specific setting in the preferred selection and/or list. The user may specify the category of application, which may allow different permission or settings for navigation of the application (e.g., fitness tracking application or social applications).

It should be noted that application publishers may have previously created a definition for permissions. Users may specify which of these definition for permissions may be optional and may be disabled during the installation and/or configuration process and also other settings such as notification behavior that can be configured and how. In one aspect, application publishers already create a definition for permissions. Definitions for permissions may be specified and/or are optional and may be disabled during the installation/configuration process and also other settings, such as notification behavior that can be configured and how the notification behaviors are configured.

The user may search applications in the application store on a device. Only the applications that conform to the required settings of a user profile may appear in the selection and/or list of filtered applications matching the user profile. The preferred settings may be used to order any remaining applications. In some cases, the default behavior of the application may not match the desired user profile settings (e.g., defined behavior settings). As such, the application not matching the desired user profile settings may be altered during the installation/configuration steps to match the pertinent settings.

Figure 4:
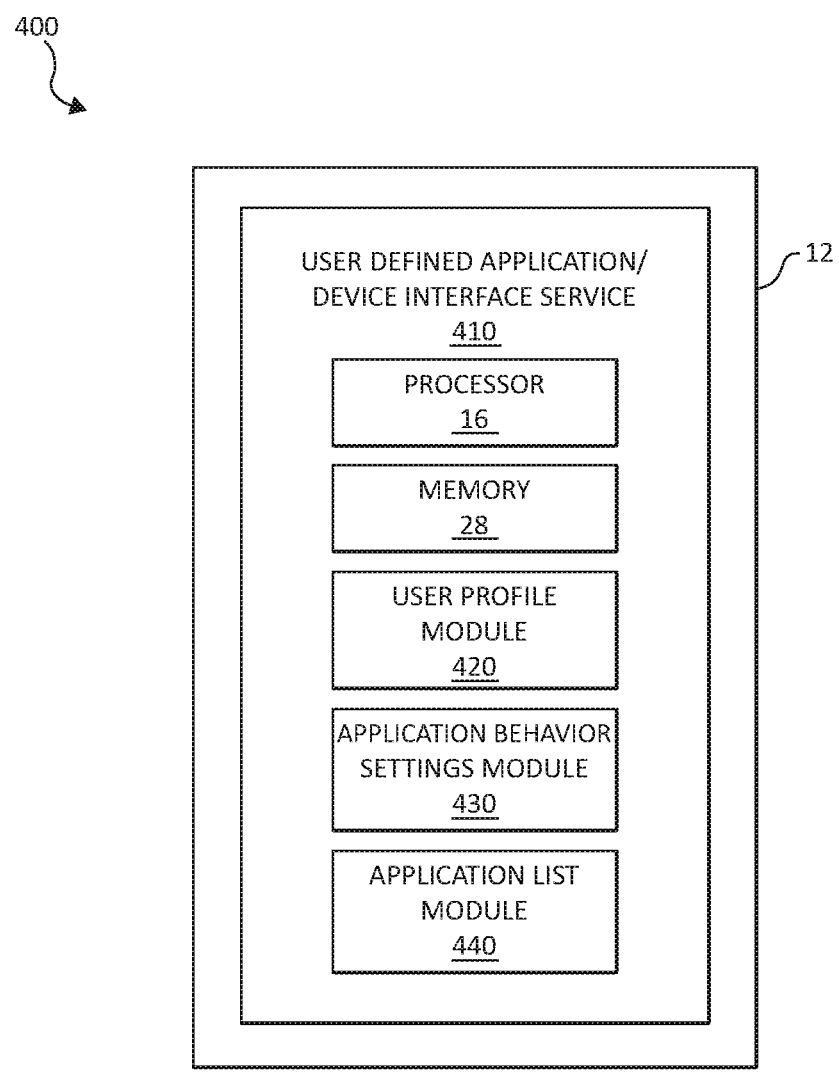
FIG. 4 is an additional block diagram depicting various user hardware and cloud computing components functioning in accordance with aspects of the present invention.

Turning now to FIG. 4, a block diagram depicting exemplary functional components of a computing environment 400 according to various mechanisms of the illustrated embodiments, is shown. FIG. 4 illustrates one or more functions, workloads, and/or protocols for a user defined application/device interface. In one aspect, each of the components, modules, and/or functions described in FIGS. 1-3 may also apply to the components, modules, and functions of FIG. 4. For example, in one aspect, the computing environment 400 may include computer system/server 12, incorporating processing unit 16 and/or memory 28 to perform various computational, data processing, workloads, and other functionality in accordance with various aspects of the present technology. As one of ordinary skill in the art will appreciate, the depiction of the various functional units in computer system/server 12 is for purposes of illustration of the figures as described herein as FIG. 4, as the functional units may be located within computer system/server 12 or elsewhere within and/or between distributed computing components. In one aspect, the computer system/server 12 may provide virtualized computing services (i.e., virtualized computing, virtualized storage, virtualized networking, etc.). More specifically, the computer system/server 12 may include and/or be associated with a virtual computing environment that provides virtualized computing, virtualized storage, virtualized networking and other virtualized services that are executing on a hardware substrate.

In one aspect, the computer system/server 12 may include a user defined application/device interface service 410 in order to create a user defined application interface. The user defined application/device interface service 410 may also employ one or more various mathematical operations (e.g., using addition, subtraction, division, multiplication, standard deviations, means, averages, statistical modeling using statistical distributions, etc.) and undergo various data analytics functions. The user defined application/device interface service 410 may function as an interface between the computing device or application of a user and/or an application store or application publisher. In one aspect, the user defined application/device interface service 410 may be installed locally on a computer device of the user, and/or externally to the computer device of the user. In an additional aspect, the user defined application/device interface service 410 may be provided by the application store. The user defined application/device interface service 410 may also include a user profile module 420, an application behavior settings module 430 and an application list module 440 (or "application selection module" 440).

In one aspect, a user may define one or more application behavior settings relating to at least behavior and appearance of a mobile application and store them in the application behavior settings module 430. The user profile module 420 may receive the one or more application behavior settings and create a user profile that includes one or more of the application behavior settings relating to at least behavior and appearance of a mobile application such that the user profile is referenced for providing a filtered selection and/or list of a plurality of mobile applications for selection. Said differently, the application list module 440, working in conjunction with the user profile module 420 and the application behavior settings module 430, may filter and/or sort one or more applications, which may be mobile applications provided by an application store, and provide the filtered or sorted selection and/or list of applications to the user.

In conjunction with the filtering and the sorting of applications (e.g., mobile applications), weighted values may be assigned to each of the behavior settings such that the weighted values may be references for ranking the filtered selection and/or list of a plurality of mobile applications. The user, in association with defining the behavior settings, may assign a ranking to each behavior or appearance setting. For example, a value of 1 may be assigned as a highest rank and most important and each subsequent number being a value of lessor importance, such as 5 being less important than 1 but more important and has a higher rank than a value of 10.

To further illustrate the present invention, by way of example, assume a user is looking for a game for the user's computing device, such as a tablet. The user may create and set up a user profile for games that lists a number of behavior attributes, such as, for example, permissions that the user prohibits approving for games relating to location and including a contact list. The user may also prefer using games that do not notify the user unless the user is already using the device. Assume, also the user searches and a number of matching games is reduced based on the required attributes and ordered based on the optional ones. In this way, the user is able to select a specific game that the user knows will conform to the attributes and the behavior he wants.

Figure 5:
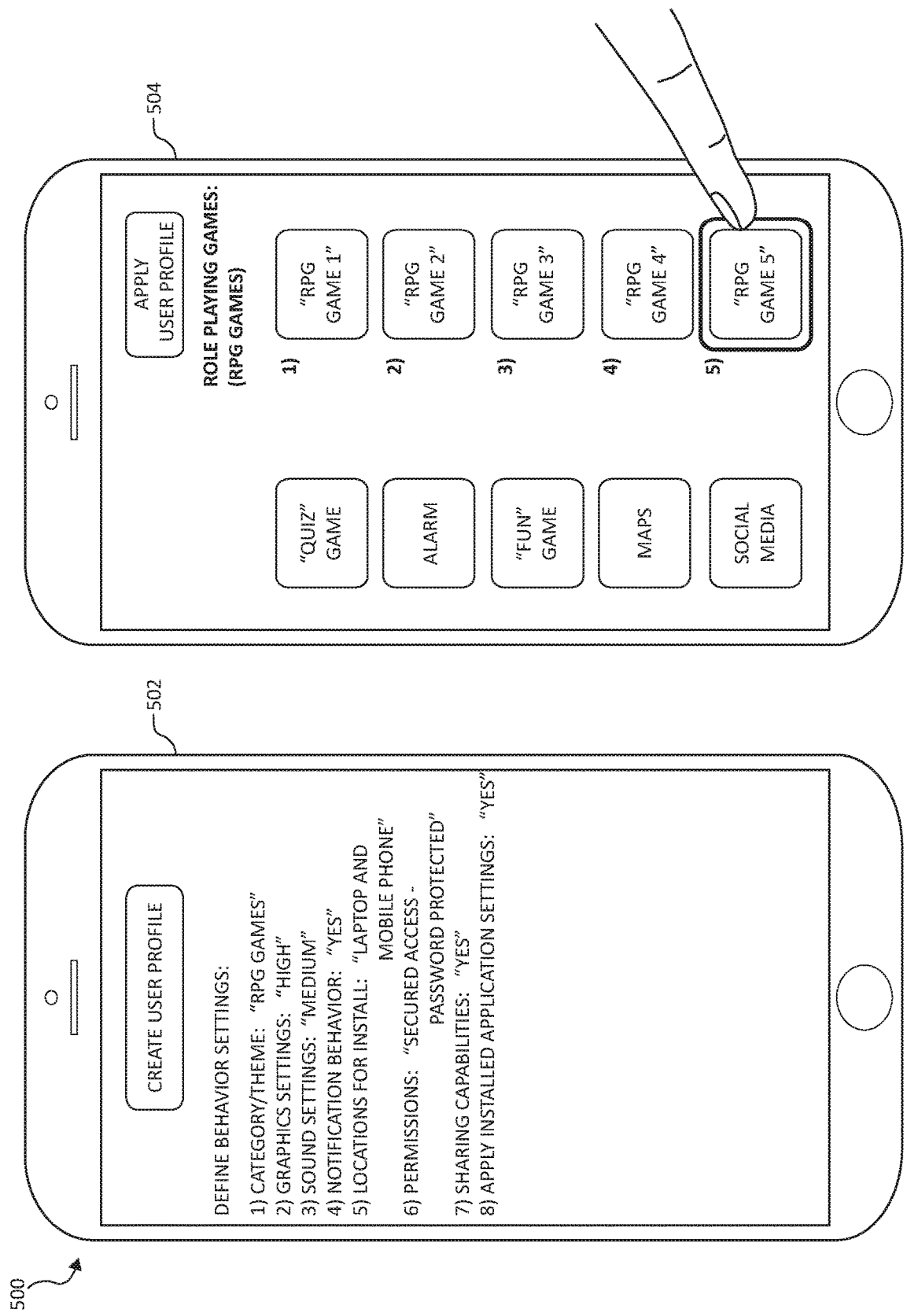
FIG. 5 is an additional block diagram depicting an exemplary functional relationship between various aspects of the present invention.

Turning now to FIG. 5, a block diagram of exemplary functionality 500 relating to user defined application interface is depicted, for use in the overall context of user defined application interface according to various aspects of the present invention. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for defining one or more application behavior settings relating to at least behavior and appearance of a mobile application in accordance with the present invention. Many of the functional blocks 500 may execute as background processes on various components, either in distributed computing components, or on the user device, or elsewhere.

A computing device 502 (e.g., a smart phone, tablet, laptop, computer, etc.) is shown containing, in the depicted embodiment, a selection option (e.g., "Create User Profile" selection button) provided to the user on the computing device 502, such as, for example, on a graphical user interface (GUI). It should be noted that although a "selection option" depicted herein is shown as an electronic selection button on a GUI, one or more selection options, such as, for example, voice commands may be used as the selection option. For example, the computing device 502 may be configured with circuitry and architectural components (e.g., microphone, receiver, recorder, speaker, etc.) that may respond to a voice command such that a voice command may trigger one or more components of the computing device 502 to detect the audio command and/or signal one or more processors and memory to encode and/or perform various embodiments described herein.

The computing device 502 may provide a selection and/or list of behavior settings for a user to define. For example, a user may define, using computer device 502, one or more behavior settings that may include one or more of a theme, graphic settings, sound settings, notifications, installation preferences, the permissions, category of types of applications, sharing capabilities with other users, settings based on user preferences, and/or a combination thereof. For example, as depicted in FIG. 5, the user may define 1) the category and/or theme, which may be defined by the user such as, for example, role playing games (RPG) games, 2) graphic settings, which may be defined as "high" (e.g., above a defined technical specification threshold for graphic settings), 3) sound settings, which may be defined as "medium" (e.g., within a defined technical specification threshold range for sound settings), 4) notification behavior (e.g., "yes"), 5) locations for installation of the application (e.g., install the application only on a laptop or smart phone), 6) a level of permissions (e.g., secured access and is password protected), 7), sharing capabilities, which may be "yes" or "no" to sharing the application, and/or 8) apply previously installed application settings, which may be set to "yes" where the behavior setting may be defined according to base settings from the previously installed application. It should be noted that the selected and/or listed behavior settings are not to be construed as exhaustive, but rather, are merely examples of the one or more behavior settings and other behaviors and/or appearances.

Completing the functional blocks of FIG. 5, upon defining one or more application behavior settings relating to at least behavior and appearance of a mobile application, as illustrated in computer device 504, a mobile application store is depicted. For example, the computer device 504 may have one or more various applications "apps", such as, for example, "fun game" (which may include a variety of types of games such as role playing games as used herein by way of example only, social media apps, travel apps, a map app, a quiz game type app, an alarm app, and/or a variety of other types of apps common to a computer device. The computer device 504 may include a selection option "Apply User Profile" to provide a filtered selection and/or list of a plurality of mobile applications (apps) to a user for selection according to a user profile defining one or more application behavior settings relating to at least behavior and appearance of a mobile application. The selection option in computer device 504 may also be similar in scope and functionality as described above for computer device 502. That is, computer device 502 and computer device 504 may be the same computer device, with FIG. 5 depicting the various embodiments in a sequential process.

Computer device 504 may depict the category of the applications, as defined by a user. For example, the user may indicate that one or more categories may be selected, for example, selecting role playing games ("RPG") (which may be the "fun game" app depicted in FIG. 5 for illustrative convenience). It should be noted that the selected category may be one or more various types of categories available in the marketplace and/or provided by the user or other application or program. The use of the category "RPG", as used herein, is merely for illustrative purposes and by way of example only and should not be defined as limiting. Accordingly, the computer device 504 executes one or more logic functions and displays the category such as, for example, RPG. Underneath the selected category (e.g., the RPG category), a selection and/or list may provide a user defined ranked order. For example, the first, highest, most important applications, games, programs, and/or services provided within the selected category (e.g., the category of RPG) that may be associated and comply with the user profile and/or the user defined ranked order, as compared to the other applications, games, programs, and/or services, may be selected and/or listed, such as 1) "RPG game 1", 2) "RPG game 2", 3) "RPG game 3", 4) "RPG game 4", and/or 5) "RPG game 5", for the selected category (e.g., the RPG category). As the descriptive sections of computer device 504 indicates, the user may select, for example, a specific application, game, program, and/or service such as, for example, game 5 (e.g., "RPG game 5") of the selected category (e.g., the RPG Category). The selection option may be highlighted via the GUI to indicated the selected option, such as the selected "RPG game 5" of FIG. 5.

Figure 6:
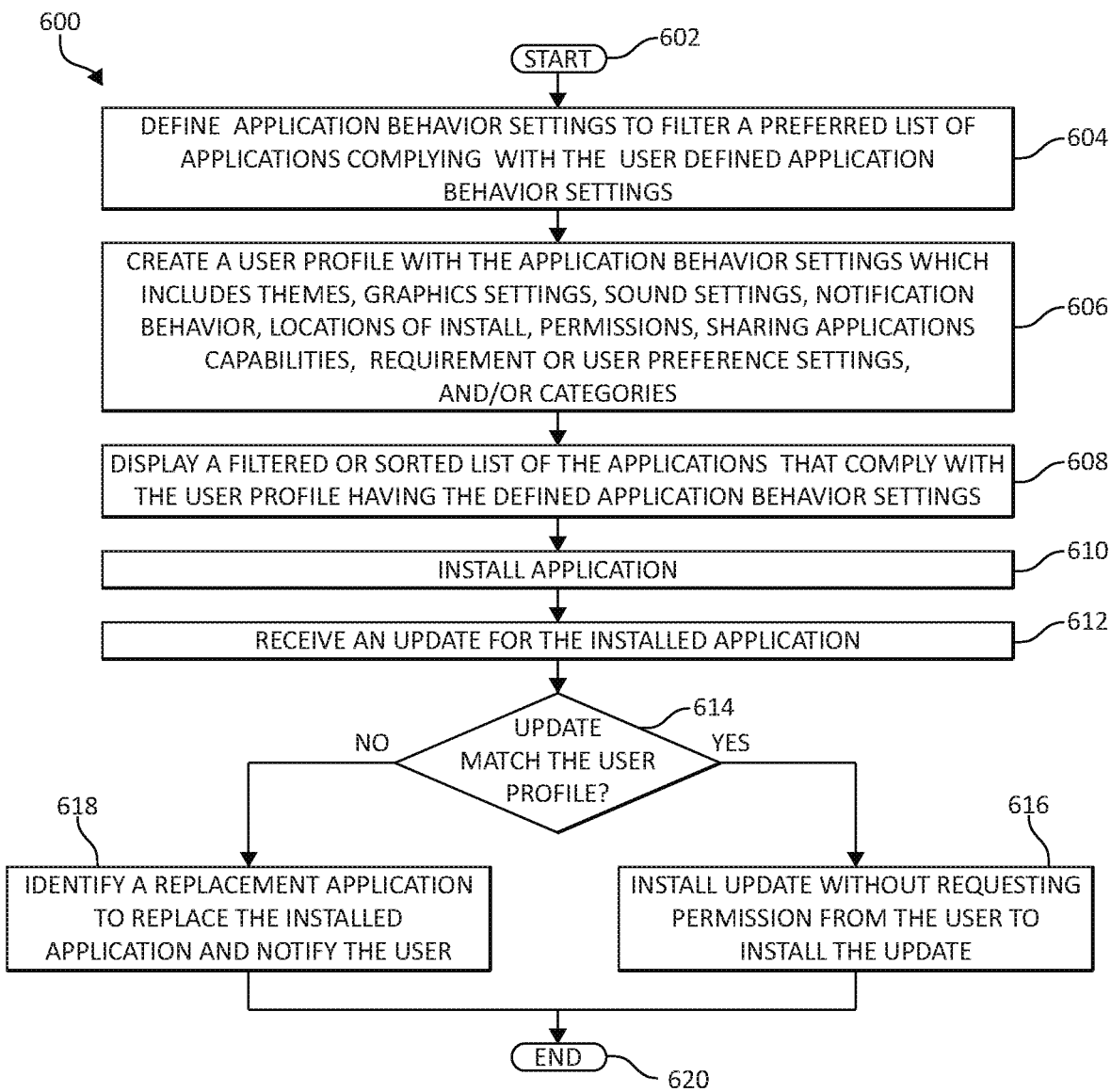
FIG. 6 is an additional flowchart diagram depicting an exemplary method for a user defined application interface by a processor; again in which aspects of the present invention may be realized.

Turning now to FIG. 6, a method 600 for a user defined application interface by a processor is depicted, in which various aspects of the illustrated embodiments may be implemented. That is, FIG. 6 is a flowchart of an additional example method 600 for a user defined application interface in a computing environment according to an example of the present invention. The functionality 600 may be implemented as a method executed as instructions on a machine, where the instructions are included on at least one computer readable medium or one non-transitory machine-readable storage medium. The functionality 600 may start in block 602. In block 604, application behavior settings may be defined to filter a preferred selection and/or list of applications complying with user defined application behavior settings. A user profile may be created with the application behavior settings, which may include, for example, themes, graphics settings, sound settings, notification behavior, locations of install, permissions, sharing applications capabilities, requirement or user preference settings, and/or categories, as in block 606. A filtered or sorted selection and/or list of the applications that comply with the user profile having the defined application behavior settings may be displayed, as in block 608. One of the applications from the selection and/or list of the applications may be selected and installed, as in block 610. In one aspect, as part of the installation of the selected application (and/or any other application not on the selection and/or list of applications complying with the user profile), if a default behavior of the selected application does not match one or more desired settings, the application behavior settings of the application may be altered during the installation process.

Continuing from block 610, at a subsequent time, an update for the installed application may be received, as in block 612. A determination operation is performed to determine whether the update matches the user profile, as in block 614. If yes, the functionality 600 moves to block 616. If no, the functionality moves to block 618. In block 616, the application may be installed without requesting permission from the user to install the update. At block 618, a replacement application may be identified to replace the installed application and notify the user. The functionality 600 may end (block 620).

Figure 7:
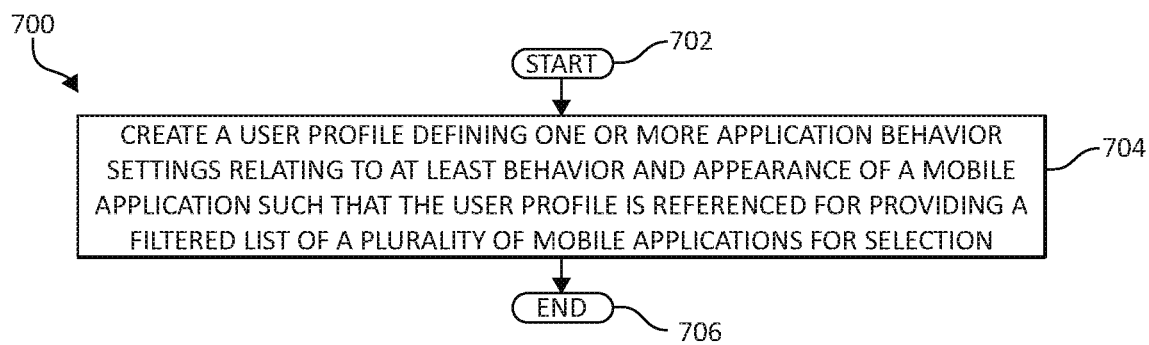
FIG. 7 is an additional flowchart diagram depicting an exemplary method for a user defined application interface by a processor; again in which aspects of the present invention may be realized.

Turning now to FIG. 7, a method 700 for a user defined application interface by a processor is depicted, in which various aspects of the illustrated embodiments may be implemented. That is, FIG. 7 is a flowchart of an additional example method 700 for a user defined application interface in a computing environment according to an example of the present invention. The functionality 700 may be implemented as a method executed as instructions on a machine, where the instructions are included on at least one computer readable medium or on at least one non-transitory machine-readable storage medium. The functionality 700 may start in block 702. In block 704, a user profile defining one or more application behavior settings relating to at least behavior and appearance of a mobile application may be created such that the user profile is referenced for providing a filtered selection and/or list of a plurality of mobile applications for selection. The functionality 700 may end, as in block 706.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive selection and/or list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing a user defined application interface, comprising:

creating a user profile defining one or more application behavior settings relating to at least behavior and appearance of a mobile application, the user profile referenced to provide a filtered selection of a plurality of mobile applications for selection; wherein the behavior of the mobile application includes at least permissions used by the mobile application associated with accessing specific data and sensors of a device in which the mobile application is to be installed;

defining the one or more behavior settings included in the user profile including defining at least a theme, graphic settings having a defined technical specification threshold, sound settings, notifications, installation preferences, the permissions, category of types of applications, sharing capabilities with other users, and settings based on user preferences;

upon selecting at least one of the plurality of mobile applications from the filtered selection by a user, installing the at least one of the plurality of mobile applications on the device;

installing an application update having the one or more application behavior settings matching the user profile to an installed application on the device without requesting permission from the user; wherein, prior to installing the application update, when it is determined that performing the application update to the installed application would render the installed application to no longer to conform with the user profile, a request for permission to install the application update is prompted to the user; and commensurate with requesting permission to install the application update when it is determined that performing the application update would render the installed application to no longer to conform with the user profile, identifying and presenting to the user an alternative one of the plurality of mobile applications most closely matching the user profile, as compared to other ones of the plurality of mobile applications, to install on the device in lieu of installing the application update to the installed application; wherein the alternative one of the plurality of mobile applications comprises a replacement to the installed application having functionality matching the installed application.

2. The method of claim 1, further including defining the one or more behavior settings according to base settings from a previously installed application.

3. The method of claim 1, further including assigning a weighted value to each of the one or more behavior settings such that the weighted values are referenced for ranking the filtered selection of a plurality of mobile applications.

4. The method of claim 1, further including altering settings of the mobile application to match the one or more application behavior settings upon determining default settings of the mobile application.

5. A system for providing a user defined application interface, comprising:
one or more computers with executable instructions that when executed cause the system to:
create a user profile defining one or more application behavior settings relating to at least behavior and appearance of a mobile application, the user profile referenced to provide a filtered selection of a plurality of mobile applications for selection; wherein the behavior of the mobile application includes at least permissions used by the mobile application associated with accessing specific data and sensors of a device in which the mobile application is to be installed;
define the one or more behavior settings included in the user profile including defining at least a theme, graphic settings having a defined technical specification threshold, sound settings, notifications, installation preferences, the permissions, category of types of applications, sharing capabilities with other users, and settings based on user preferences;
upon selecting at least one of the plurality of mobile applications from the filtered selection by a user, installs the at least one of the plurality of mobile applications on the device;
install an application update having the one or more application behavior settings matching the user profile to an installed application on the device without requesting permission from the user; wherein, prior to installing the application update, when it is determined that performing the application update to the installed application would render the installed application to no longer to conform with the user profile, a request for permission to install the application update is prompted to the user; and
commensurate with requesting permission to install the application update when it is determined that performing the application update would render the installed application to no longer to conform with the user profile, identify and present to the user an alternative one of the plurality of mobile applications most closely matching the user profile, as compared to other ones of the plurality of mobile applications, to install on the device in lieu of installing the application update to the installed application; wherein the alternative one of the plurality of mobile applications comprises a replacement to the installed application having functionality matching the installed application.

6. The system of claim 5, wherein the executable instructions define the one or more behavior settings according to base settings from a previously installed application.

7. The system of claim 5, wherein the executable instructions assign a weighted value to each of the one or more behavior settings such that the weighted values are referenced for ranking the filtered selection of a plurality of mobile applications.

8. The system of claim 5, wherein the executable instructions alter settings of the mobile application to match the one or more application behavior settings upon determining default settings of the mobile application.

9. A computer program product for, by a processor, providing a user defined application interface, the computer program product comprising a non-transitory computer-readable storage medium having computer-readable program code portions stored therein, the computer-readable program code portions comprising:
an executable portion that creates a user profile defining one or more application behavior settings relating to at least behavior and appearance of a mobile application, the user profile referenced to provide a filtered selection of a plurality of mobile applications for selection; wherein the behavior of the mobile application includes at least permissions used by the mobile application associated with accessing specific data and sensors of a device in which the mobile application is to be installed;
an executable portion that defines the one or more behavior settings to be included in the user profile including defining at least a theme, graphic settings having a defined technical specification threshold, sound settings, notifications, installation preferences, the permissions, category of types of applications, sharing capabilities with other users, and settings based on user preferences;
an executable portion that, upon selecting at least one of the plurality of mobile applications from the filtered selection by a user, installs the at least one of the plurality of mobile applications on the device;
an executable portion that installs an application update having the one or more application behavior settings matching the user profile to an installed application on the device without requesting permission from the user; wherein, prior to installing the application update, when it is determined that performing the application update to the installed application would render the installed application to no longer to conform with the user profile, a request for permission to install the application update is prompted to the user; and
an executable portion that, commensurate with requesting permission to install the application update when it is determined that performing the application update would render the installed application to no longer to conform with the user profile, identifies and presents to the user an alternative one of the plurality of mobile applications most closely matching the user profile, as compared to other ones of the plurality of mobile applications, to install on the device in lieu of installing the application update to the installed application; wherein the alternative one of the plurality of mobile applications comprises a replacement to the installed application having functionality matching the installed application.

10. The computer program product of claim 9, further including an executable portion that defines the one or more behavior settings according to base settings from a previously installed application.

11. The computer program product of claim 9, further including an executable portion that assigns a weighted value to each of the one or more behavior settings such that the weighted values are referenced for ranking the filtered selection of a plurality of mobile applications.

12. The computer program product of claim 9, further including an executable portion that alters settings of the mobile application to match the one or more application behavior settings upon determining default settings of the mobile application.

* * * * *